(12) United States Patent
Nomura et al.

(10) Patent No.: US 6,974,259 B2
(45) Date of Patent: Dec. 13, 2005

(54) BEARING DEVICE FOR VEHICLE

(75) Inventors: Keisuke Nomura, Osaka (JP);
Masahiro Inoue, Osaka (JP); Koji Shima, Osaka (JP); Yoshifumi Shige, Osaka (JP); Setsuji Suzuki, Aichi (JP); Makoto Okada, Aichi (JP); Seiji Hojo, Aichi (JP); Koichi Aida, Aichi (JP)

(73) Assignee: Koyo Seiko Co., Ltd., Osaka (JP)

( * ) Notice: Subject to any disclaimer, the term of this patent is extended or adjusted under 35 U.S.C. 154(b) by 37 days.

(21) Appl. No.: 10/362,337

(22) PCT Filed: Aug. 30, 2001

(86) PCT No.: PCT/JP01/07501

§ 371 (c)(1),
(2), (4) Date: Jul. 30, 2003

(87) PCT Pub. No.: WO02/18808

PCT Pub. Date: Mar. 7, 2002

(65) Prior Publication Data

US 2004/0022468 A1 Feb. 5, 2004

(30) Foreign Application Priority Data

Aug. 31, 2000 (JP) ............................... 2000-262546

(51) Int. Cl.⁷ .............................................. F16C 19/18
(52) U.S. Cl. ....................................................... 384/544
(58) Field of Search ................................ 384/544, 589, 384/537; 301/105.1; 464/178, 904, 906

(56) References Cited

U.S. PATENT DOCUMENTS

| 4,804,233 A | * | 2/1989 | Hofmann et al. ............ 384/544 |
| 5,725,285 A | * | 3/1998 | Niebling et al. ............. 384/544 |
| 6,135,571 A | * | 10/2000 | Mizukoshi et al. ...... 301/105.1 |

FOREIGN PATENT DOCUMENTS

| JP | 6-10951 | 1/1994 |
| JP | 9-96317 | 4/1997 |
| JP | 2000-74083 | 3/2000 |
| JP | 2000-142009 | 5/2000 |

* cited by examiner

Primary Examiner—Thomas R. Hannon
(74) Attorney, Agent, or Firm—Jordan and Hamburg LLP

(57) ABSTRACT

A vehicle-use bearing device having a double row rolling bearing fitted around an outer peripheral surface of a hollow shaft portion of a hub wheel, wherein a held portion between an axially intermediate position and a vehicle outer side in the hollow shaft portion of the hub wheel is axially held between the axially intermediate position of an outer ring shaft portion of a constant velocity joint and the vehicle outer side so that a cup-shaped cylindrical portion of an outer ring of the constant velocity joint is free of contact with a caulked portion in the hollow shaft portion of the hub wheel at the shaft end on the vehicle inner side in order to connect the hub wheel with the constant velocity joint without a clearance, whereby an excessive preload which can affect a rolling performance of the double row rolling bearing is not imparted on the bearing.

12 Claims, 11 Drawing Sheets

BEARING DEVICE FOR VEHICLE

TECHNICAL FIELD

The present invention relates to a vehicle-use bearing device, and more particularly to a vehicle-use bearing device which rotatably supports wheels of an automobile.

BACKGROUND TECHNIQUE

Referring to FIG. 12, conventional bearing devices for driving wheels have a rolling bearing 2 fitted around an outer periphery of a hollow shaft portion 12 of a hub wheel 1 to which a wheel can be fitted. The hub wheel 1 is tiltably coupled with a shaft 7 by a constant velocity joint 3. A shaft end on the vehicle inner side of the hollow shaft portion 12 in the hub wheel 1 is bent and deformed radially outward to constitute a caulked portion 12a to be caulked on an outer end face of an inner ring 25 of the rolling bearing 2 so that the inner ring 25 is thereby preloaded and prevented from falling out.

An outer ring 31 of the constant velocity joint 3 comprises a cup-shaped cylindrical portion 35 which is used as a raceway for a group of balls for tilting guide and a shaft portion 36 which is inserted into the hollow shaft portion 12 of the hub wheel 1 so as to be spline fitted to a small diameter portion of the cup-shaped cylindrical portion 35.

The cup-shaped cylindrical portion 35 of the constant velocity joint 3 is abutted on the caulked portion 12a formed by the radially outward bent and deformed shaft end on the vehicle inner side of the hollow shaft portion 12 in the hub wheel 1. The constant velocity joint 3 is connected to the hub wheel 1 with a nut 36i fastened in the manner in which an end face of the nut 36i screwed into a small diameter screw shaft portion 36h on the vehicle outer side of the outer ring shaft portion 36 of the constant velocity joint 3 contacts with an end face of an opening 12c on the vehicle outer side of the hollow shaft portion 12 in the hub wheel 1.

The hub unit described above generally, through caulking the vehicle inner side end portion of the hub wheel 1 on the outer end face of the inner ring 25 of the rolling bearing 2, imparts the preload to the rolling bearing 2.

In such conventional bearing devices, the constant velocity joint 3 is connected to the hollow shaft portion 12 of the hub wheel 1 in the manner in which no rattle in the axial direction is generated. Thus, fastening the nut 36i too tight would result in an excessive preload with respect to the rolling bearing 2 via the caulked portion 12a, leading to the likelihood of an adverse effect on a rolling performance of the rolling bearing 2.

Therefore, a main object of the present invention is to provide a bearing device wherein a constant velocity joint can be connected to a hub wheel without imparting an excessive preload with respect to a rolling bearing.

DISCLOSURE OF THE INVENTION

The present invention comprises a hub wheel having a hollow shaft portion, a rolling bearing fitted around the hollow shaft portion of the hub wheel and a constant velocity joint tiltably coupling an input shaft with the hub wheel. The constant velocity joint has an outer ring. The outer ring comprises a cylindrical portion (an outer ring cylindrical portion) housing an element for tilting guide and a shaft portion (an outer ring shaft portion) provided adjacently to the outer ring cylindrical portion. A shaft end on the vehicle inner side of the hollow shaft portion of the hub wheel is caulked on an outer end face on the vehicle inner side of an inner ring of the rolling bearing. The outer ring shaft portion of the constant velocity joint is inserted into the hollow shaft portion of the hub wheel so as not to be circumferentially rotated.

A held portion provided between the axially intermediate position and the vehicle outer side in the hollow shaft portion of the hub wheel is axially sandwiched between the axially intermediate position and the vehicle outer side in the outer ring shaft portion of the constant velocity joint. Accordingly, the outer ring of the constant velocity joint is connected to the hub wheel in the manner in which the outer ring cylindrical portion of the constant velocity joint is free of contact with the shaft end on the vehicle inner side of the hollow shaft portion of the hub wheel caulked on the outer end face on the vehicle inner side of the inner ring of the rolling bearing.

According to the present invention, the outer ring of the constant velocity joint is connected to the hub wheel in the manner in which the outer ring cylindrical portion of the constant velocity joint is free of contact with the shaft end of the hub wheel caulked on the outer end face on the vehicle inner side of the inner ring.

To put it differently, in the present invention, the caulked portion does not receive any influence arisen from the connection of the outer ring of the constant velocity joint to the hub wheel. Thus, the described connection no longer imparts an excessive preload that could adversely influence the rolling performance of the inner ring of the rolling bearing.

More particularly in the present invention, the axially intermediate position and the vehicle outer side in the hollow shaft portion of the hub wheel are axially sandwiched between the axially intermediate position and the vehicle outer side in the outer ring shaft portion of the constant velocity joint. The outer ring of the constant velocity joint is thereby connected to the hub wheel.

In the case described above, it is unnecessary, when the outer ring of the constant velocity joint is connected to the hub wheel, to adopt the conventional manner such that the caulked portion of the shaft end on the vehicle inner side and an opening on the vehicle outer side of the hollow shaft portion of the hub wheel are axially sandwiched between the outer ring cylindrical portion of the constant velocity joint and the shaft end on the vehicle outer side.

Thus, a clearance can be provided between the caulked portion and the outer ring cylindrical portion, which eliminates the excessive preload imparted on the inner ring of the rolling bearing from the outer ring cylindrical portion. Consequently, a desired life of the rolling bearing can be achieved with no reduced rolling performance thereof in the absence of the excessive preload.

Preferably in the present invention, in the inner periphery of the hollow shaft portion of the hub wheel, the distance between the vehicle inner side shaft end and the axially intermediate position is set to a large diameter, and the distance between the axially intermediate position and the vehicle outer side opening is set to a small diameter. Further, in the outer periphery of the outer ring shaft portion of the constant velocity joint, the distance between the vehicle inner side shaft end and the axially intermediate position is set to a large diameter, and the distance between the axially intermediate position and the vehicle outer side shaft end is set to a small diameter. The outer ring shaft portion of the constant velocity joint is inserted from the vehicle inner side into the hollow shaft portion of the hub wheel in the manner in which a second step wall surface between a large diameter portion and a small diameter portion in the outer ring shaft portion of the constant velocity joint is abutted on a first step wall surface between a large diameter portion and a small diameter portion in the hollow shaft portion of the hub wheel. In such a manner, the axial position of the outer ring shaft portion with respect to the hollow shaft portion is determined.

When the outer ring of the constant velocity joint is connected to the hub wheel under the circumstances described above, it becomes unnecessary to abut the outer ring cylindrical portion of the constant velocity joint on the caulked portion of the vehicle inner side shaft end in the hollow shaft portion of the hub wheel in order to determine the axial position of the outer ring shaft portion with respect to the hollow shaft portion, which has been the conventional step. This eventually provides a clearance between the caulked portion and the outer ring cylindrical portion, which enables to release the inner ring of the rolling bearing from the excessive preload imparted from the outer ring cylindrical portion. As a result, an appropriate preload can be imparted with respect to the inner ring of the rolling bearing to achieve a life desired in the designing process.

THE BEST MODE FOR CARRYING OUT THE INVENTION

Figure 1:
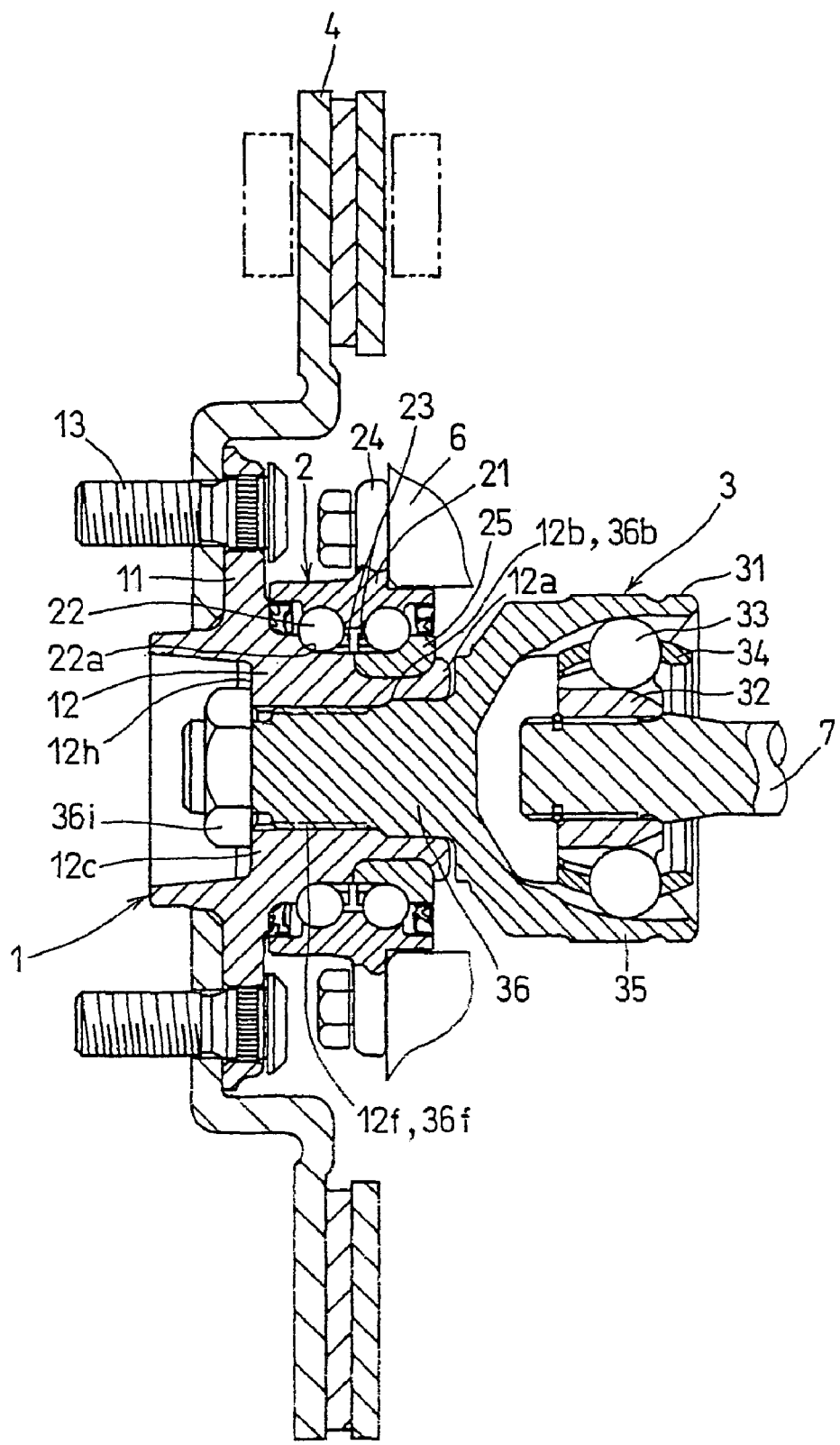
FIG. 1 is a side view in longitudinal section of a vehicle-use bearing device according to the best mode for executing the present invention.
Figure 2:
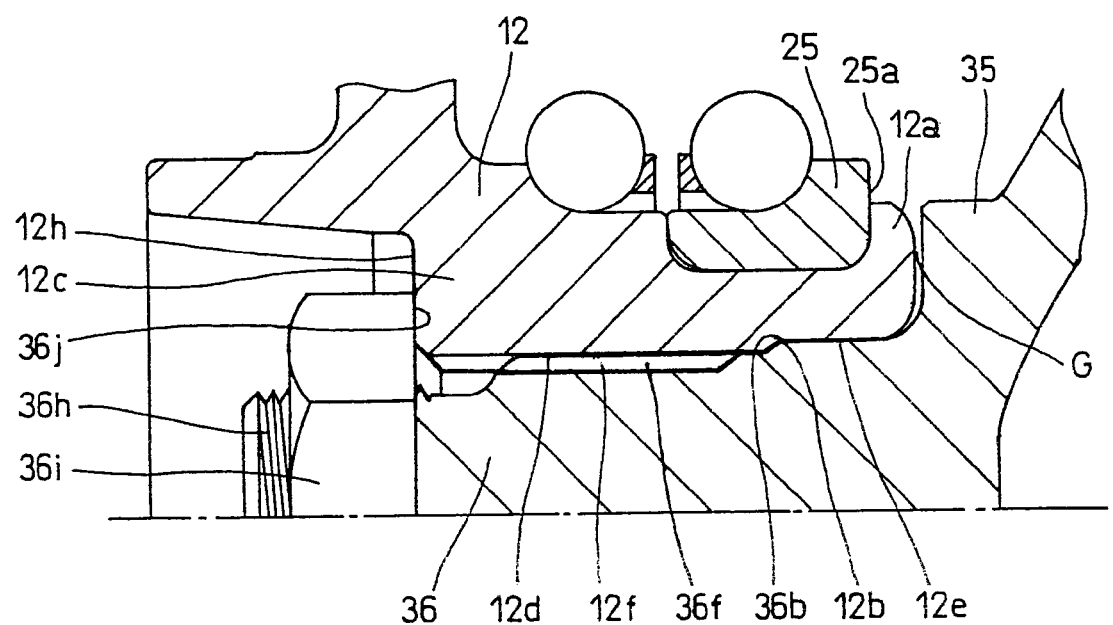
FIG. 2 is an enlarged sectional view of main parts of the bearing device in FIG. 1.
Figure 3:
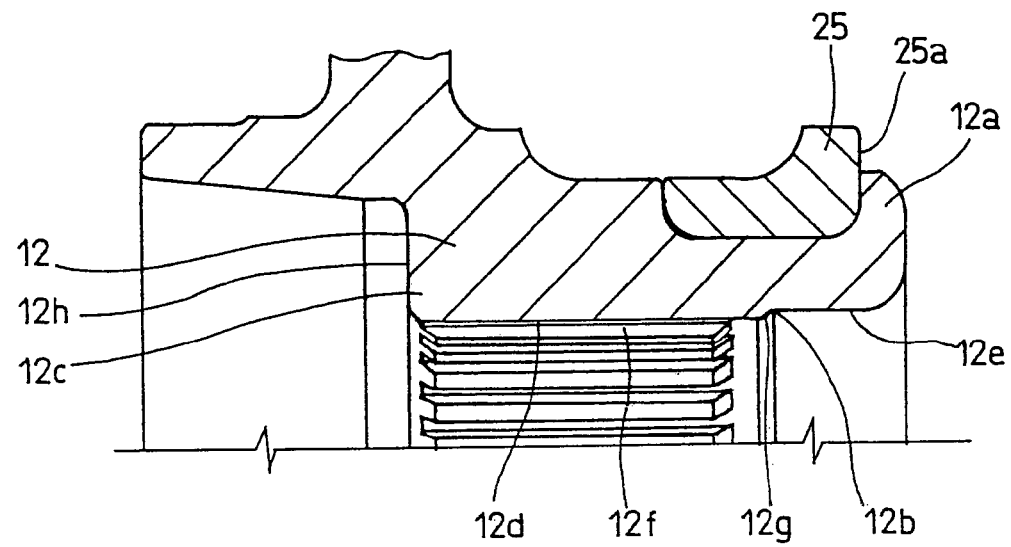
FIG. 3 is an enlarged sectional view of the hub wheel of the bearing device in FIG. 1.
Figure 4:
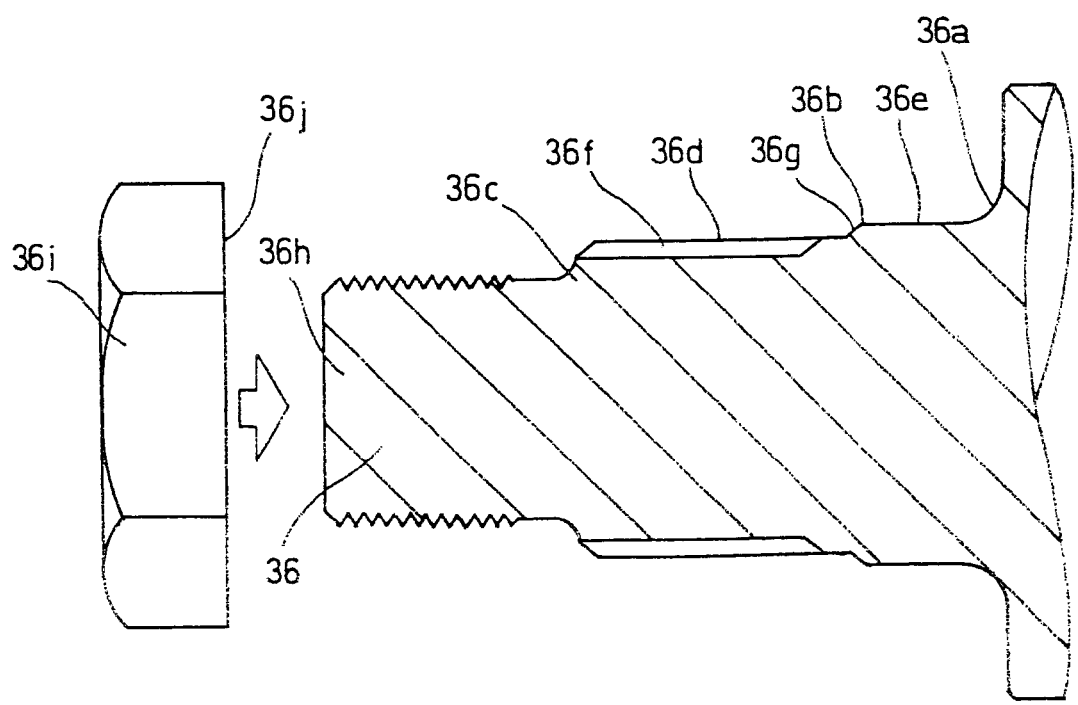
FIG. 4 is an enlarged sectional view of the outer ring shaft portion of the constant velocity joint of the bearing device in FIG. 1.

Referring to FIGS. 1 through 4, described is a vehicle-use bearing device according to the best mode for executing the present invention. The bearing device is a type of bearing used on the driving wheel side of an automobile and comprises a hub wheel 1, a rolling bearing 2 and a constant velocity joint 3.

The hub wheel 1 has a radially outward flange 11, to which a wheel not shown is fitted, and a hollow shaft portion 12 having a bearing-engaging region in the outer periphery thereof, to which the rolling bearing 2 is fixed.

Closer to the vehicle outer side on the outer peripheral surface of the hollow shaft portion 12 of the hub wheel 1 is formed a raceway surface 22a for a group of single-row balls 22 used for the rolling bearing 2. The vehicle inner side shaft end in the hollow shaft portion 12 of the hub wheel 1 is bent radially outward and caulked on an outer end face of an inner ring 25 on the vehicle inner side of the rolling bearing 2 to constitute a caulked portion 12a.

The rolling bearing 2 is, as in the usual double-raw rolling bearings, comprised of a single outer ring 21 having double row raceway grooves, the plurality of balls 22 provided in two rows used as rolling elements and two crown-shaped cages 23. As described, one of originally required two inner rings is substituted by the raceway surface 22a on the vehicle outer side of the hub wheel 1, and only the inner ring 25 on the vehicle inner side is provided. In the outer ring 21 is formed a radially outward flange 24 which is fixed to a vehicle body 6 with bolts.

A constant velocity joint publicly known as Zeppa type (bar field type), for example, is specified for the constant velocity joint 3, which is comprised of an outer ring 31, an inner ring 32, balls 33 and a cage 34.

The outer ring 31 is comprised of a cup-shaped cylindrical portion 35 wherein the inner ring 32, the balls 33 and the cage 34 and such are arranged to be housed, and a shaft portion 36 (outer ring shaft portion) connected to the cylindrical portion 35 on the small diameter side thereof as an integral unit.

One end side of an input shaft 7 for inputting a rotational motive power is spline fitted to the inner ring 32 and also fixed to the same by a locating snap ring (reference symbol omitted) or such so as not to fall out. The other end of the input shaft 7 is fitted on a differential device in the vehicle via another constant velocity joint not shown.

The rolling bearing 2 is fitted around the outer periphery of the hub wheel 1. The constant velocity joint 3 is mounted on the hub wheel 1 in proximity to the rolling bearing 2.

Bolts 13 are penetrably inserted into a few positions of the circumference of the flange 11 in order to fix a disk rotor 4 of a disk brake device and a wheel (now shown).

In the bearing device described above, the rotational motive power of the input shaft 7 is conveyed via the constant velocity joint 3 to a wheel not shown fitted to the hub wheel 1.

Described hereinafter are the features of the bearing device.

The cylindrical portion 35 of the outer ring 31 of the constant velocity joint 3 is in the state of having no contact with the caulked portion 12a because of a clearance G. Accordingly, the outer ring 31 of the constant velocity joint 3 is connected to the hollow shaft portion 12 of the hub wheel 1.

In the hollow shaft portion 12 of the hub wheel 1, a portion between an axially intermediate position 12b and an opening 12c on the vehicle outer side is addressed as a held portion. The held portion is axially sandwiched between an axially intermediate position 36b and a shaft end 36c side on the vehicle outer side in the outer ring shaft portion 36 of the constant velocity joint 3. According to the manner in which the held portion is sandwiched, the outer ring 31 of the constant velocity joint 3 is connected to the hollow shaft portion 12 of the hub wheel 1.

To be specific, in the inner periphery of the hollow shaft portion 12 of the hub wheel 1, the distance between the caulked portion 12a, that is the vehicle inner side shaft end, and the axially intermediate position 12b is set to a large diameter, the distance between the axially intermediate position 12b and the vehicle outer side opening 12c is set to a small diameter. In the small diameter portion is provided a male spline 12f. A groove bottom 12d of the male spline 12f is located on the inner diameter side with respect to a large diameter 12e.

In the outer periphery of the outer ring shaft portion 36 of the constant velocity joint 3, the distance between a shaft end 36a on the vehicle inner side and the axially intermediate position 36b is set to a large diameter, and likewise, the distance between the intermediate position 36b and the vehicle outer side shaft end 36c is set to a small diameter. A male spline 36f is provided in the small diameter portion. A tip 36d of the male spline 36f is located on the inner diameter side with respect to a large diameter portion 36e.

When the outer ring shaft portion 36 of the constant velocity joint 3 is inserted from the vehicle inner side into the hollow shaft portion 12 of the hub wheel 1, a second step wall surface 36g between the large diameter portion and the small diameter portion in the outer ring shaft portion 36 of the constant velocity joint 3 is abutted on a first step wall surface 12g between the large diameter portion and the small diameter portion in the hollow shaft portion 12 of the hub wheel 1. Thus, the axial position of the outer ring shaft portion 36 with respect to the hollow shaft portion 12 is determined.

At the vehicle outer side shaft end 36c in the outer ring shaft portion 36 of the constant velocity joint 3 is provided a small diameter screw shaft portion 36h, into which a nut 36i is screwed. An end face 36j of the nut 36i is located and fitted with respect to an end face 12h of the vehicle outer side opening 12c in the hollow shaft portion 12 of the hub wheel 1, in the case of which, adhesives or other materials can be used to prevent the nut 36i from loosening.

As described hereinbefore, the cup-shaped cylindrical portion 35 in the outer ring 31 of the constant velocity joint 3 is, with the axial clearance G in between, in the state of having no contact with the caulked portion 12a caulked on an outer end face 25a of the inner ring 25 on the vehicle outer side of the rolling bearing 2. Accordingly, the outer ring 31 of the constant velocity joint 3 is connected to the hub wheel 1.

Therefore, there is no longer the excessive preload imparted on the inner ring 25 from the caulked portion 12a in the outer ring shaft portion 36 of the constant velocity joint 3.

ANOTHER MODE FOR CARRYING OUT THE INVENTION (1) According to the mode for carrying out the present invention described above, the nut 36i is relied upon for the location of the shaft end 36c side on the vehicle outer side in the outer ring shaft portion 36 of the constant velocity joint 3 with respect to the end face 12h of the vehicle outer side opening 12c in the hollow shaft portion 12 of the hub wheel 1. However, the formations shown in FIGS. 5 and 6 may alternatively be adopted.

Figure 5:
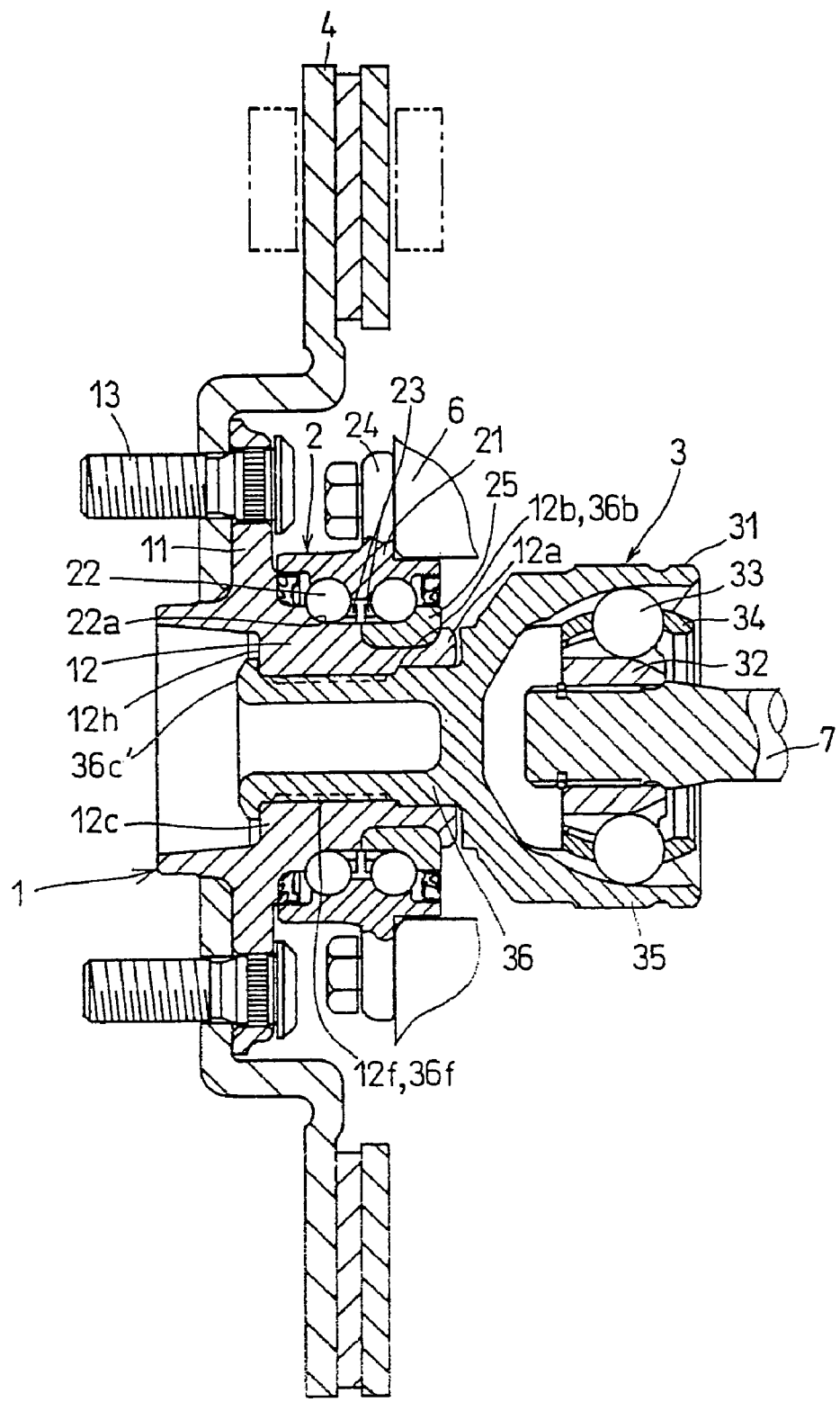
FIG. 5 is a side view in longitudinal section of a vehicle-use bearing device according to another mode for executing the present invention.
Figure 6:
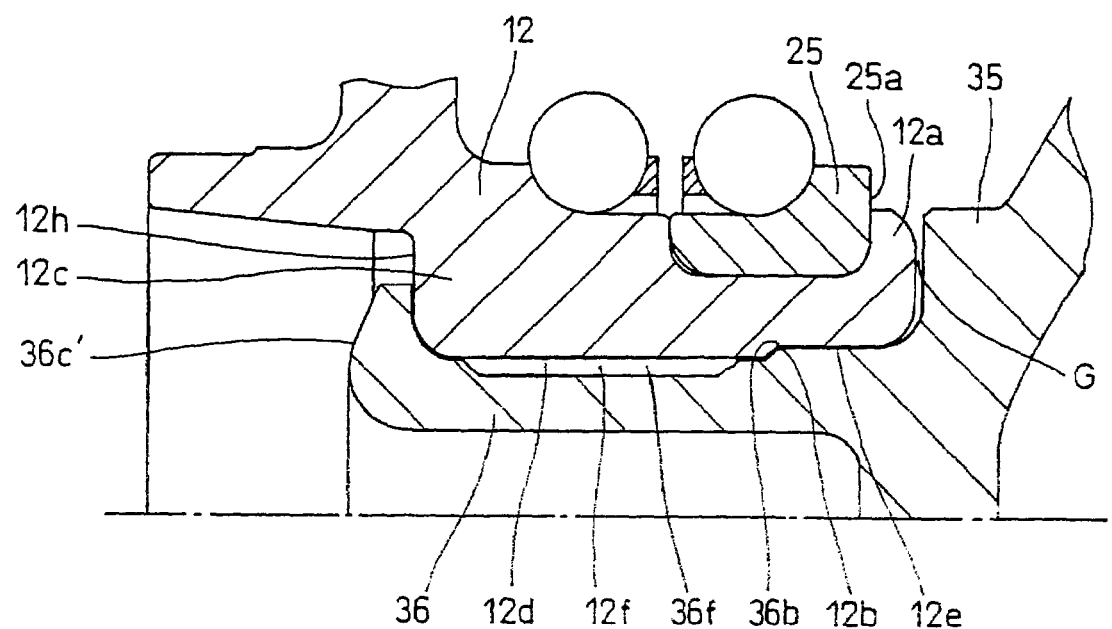
FIG. 6 is an enlarged sectional view of main parts of the bearing device in FIG. 5.

Referring to FIGS. 5 and 6, an outer ring shaft portion 36 of a constant velocity joint 3 is of hollow shaft structure. A shaft end 36c on the vehicle outer side of the outer ring shaft portion 36 is bent and deformed radially outward to constitute a caulked portion 36c', which is caulked on an end face 12h of an opening 12c on the vehicle outer side of a hollow shaft portion 12.

In the case of the above formation, an outer ring 31 of the constant velocity joint 3 is connected to a hub wheel 1 in the state in which a cup-shaped cylindrical portion 35 in the outer ring 31 of the constant velocity joint 3 is free of contact, with an axial clearance G in between, with a caulked portion 12a on the inner ring 25 side on the vehicle inner side of a rolling bearing 2.

In the hollow shaft portion 12 of the hub wheel 1, an axially intermediate position 12b and the vehicle outer side opening 12c are arranged to be axially sandwiched between an intermediate position 36b and the caulked portion 36c' in the outer ring shaft portion 36 of the constant velocity joint 3. Then, the outer ring 31 of the constant velocity joint 3 is connected to the hub wheel 1.

Therefore, there is no longer an excessive preload imparted on the inner ring 25, via the caulked portion 12a, from the outer ring shaft portion 36 of the constant velocity joint 3.

(2) In the mode for carrying out the present invention described above, a second step wall surface 36g between a large diameter portion and a small diameter portion in the outer ring shaft portion 36 of the constant velocity joint 3 is arranged to abut on a first step wall surface 12g between a large diameter portion and a small diameter portion in the hollow shaft portion 12 of the hub wheel 1 with the outer ring shaft portion 36 of the constant velocity joint 3 inserted from the vehicle outer side into the hollow shaft portion 12 of the hub wheel 1. However, the formations in FIGS. 7 through 9 may alternatively be adopted.

Figure 7:
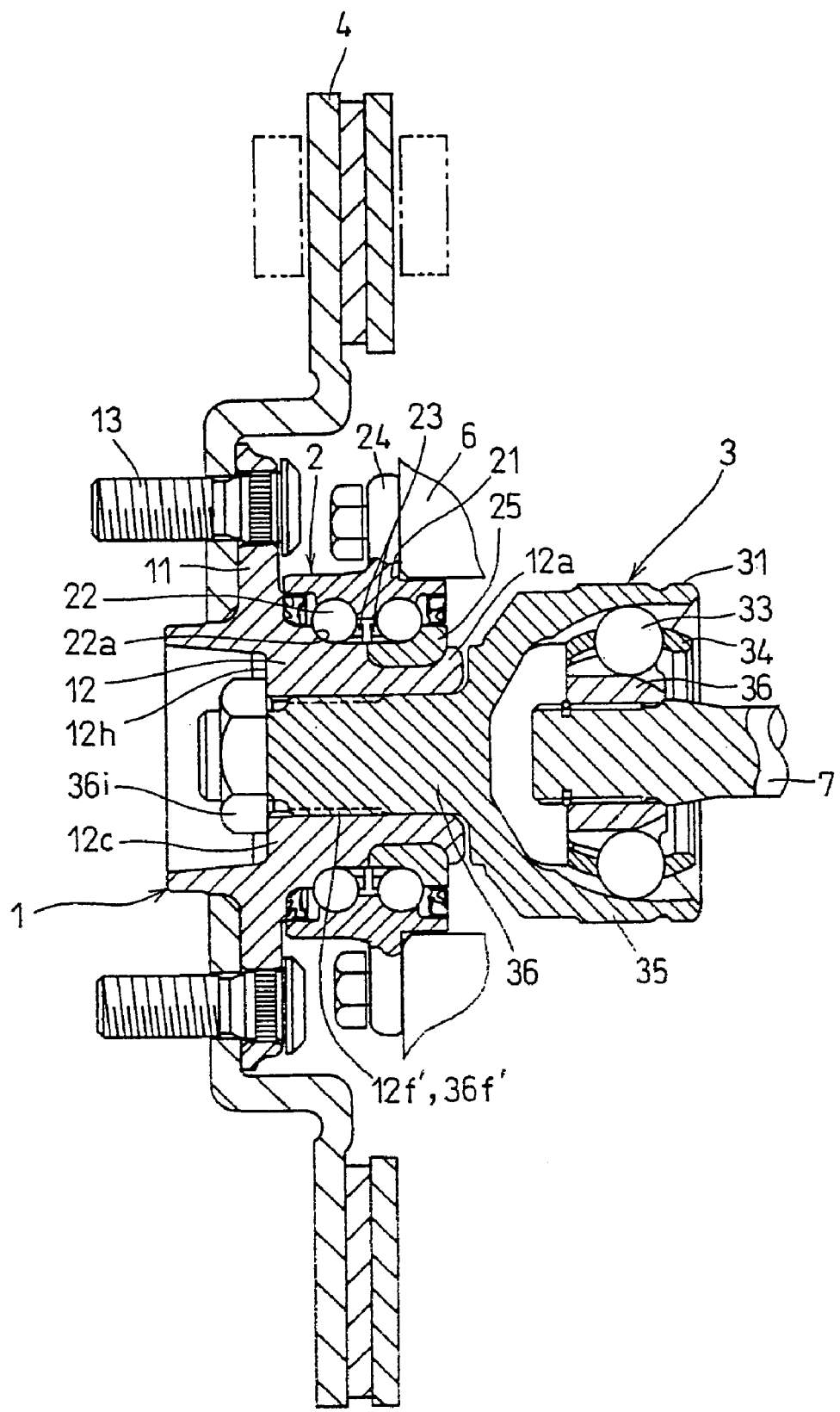
FIG. 7 is a side view in longitudinal section of a vehicle-use bearing device according to still another mode for executing the present invention.
Figure 8:
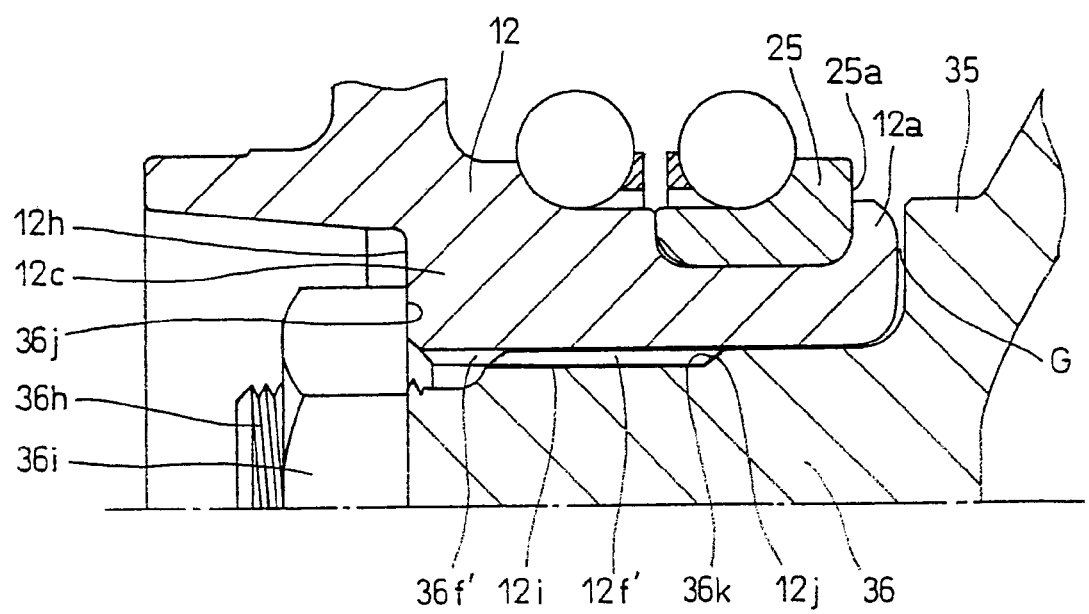
FIG. 8 is an enlarged sectional view of main parts of the bearing device in FIG. 7.
Figure 9A:
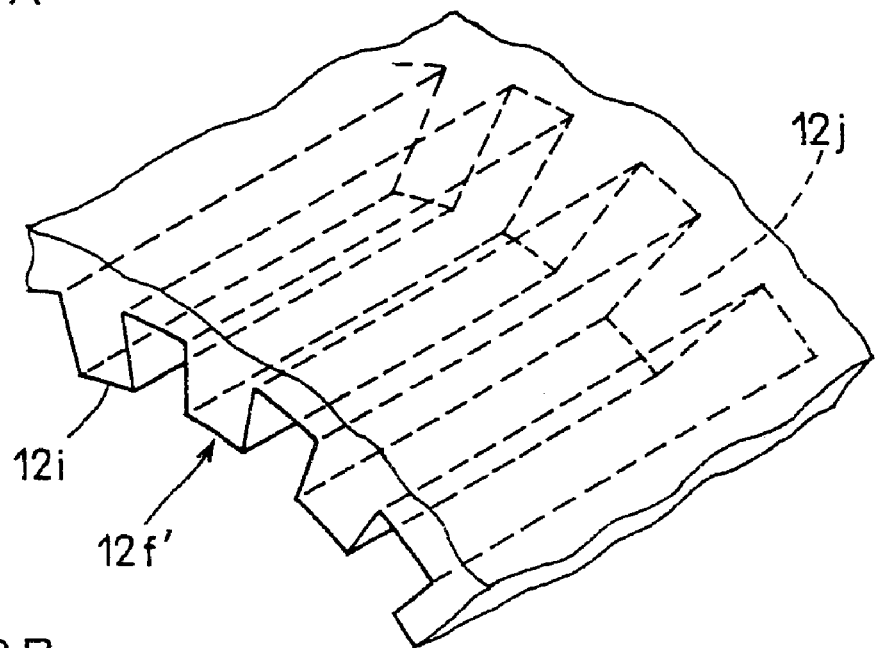
FIG. 9A is a partial perspective view of a hollow shaft portion of a hub wheel of the bearing device in FIG. 7.
Figure 9B:
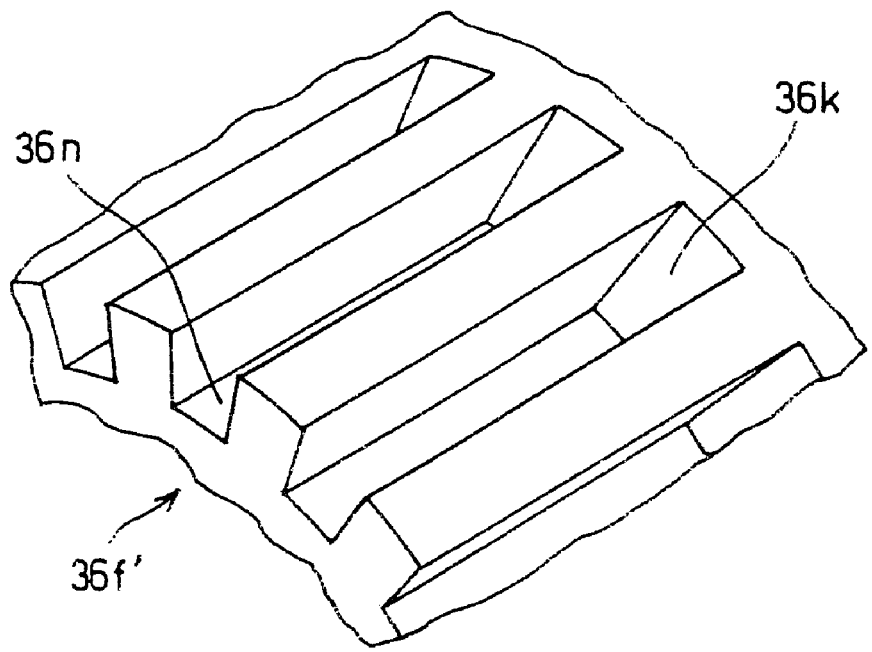
FIG. 9B is a partial perspective view of an outer ring shaft portion of a constant velocity joint of the bearing device in FIG. 7.

Referring to FIGS. 7 through 9, in the region extending from an axially intermediate position 12b through an opening on the vehicle outer side in the inner periphery of a hollow shaft portion 12 of a hub wheel 1 is provided a female spline 12f' having a tip surface 12i smaller than the inner diameter thereof.

In the region extending from an axially intermediate position 12b through a shaft end 36c on the vehicle outer side in the outer periphery of an outer ring shaft portion 36 of a constant velocity joint 3 is provided a male spline 36f' having a bottom surface 36n smaller than the outer periphery of the outer ring shaft portion 36.

When the outer ring shaft portion 36 of the constant velocity joint 3 is inserted from the vehicle outer side into the hollow shaft portion 12 of the hub wheel 1, an end portion 36k on the vehicle inner side of the male spline 36f' is pushed against an end portion 12j on the vehicle inner side of the female spline 12f' in the hollow shaft portion 12 of the hub wheel 1. In the above formation, the axial position of the outer ring shaft portion 36 with respect to the hollow shaft portion 12 may be determined.

(3) In the mode for carrying out the present invention described above, a fine clearance G resides between the caulked portion 12a formed by the radially outward bent and deformed shaft end on the vehicle inner side of the hollow shaft portion 12 of the hub wheel 1 and the cylindrical portion 35 in the outer ring 31 of the constant velocity joint 3.

The clearance G could possibly allow muddy water to invade into between the splines provided respectively in the inner periphery of the hollow shaft portion 12 and in the outer periphery of the outer ring shaft portion 36 of the constant velocity joint 3, to remain and develop corrosion therein.

Figure 10:
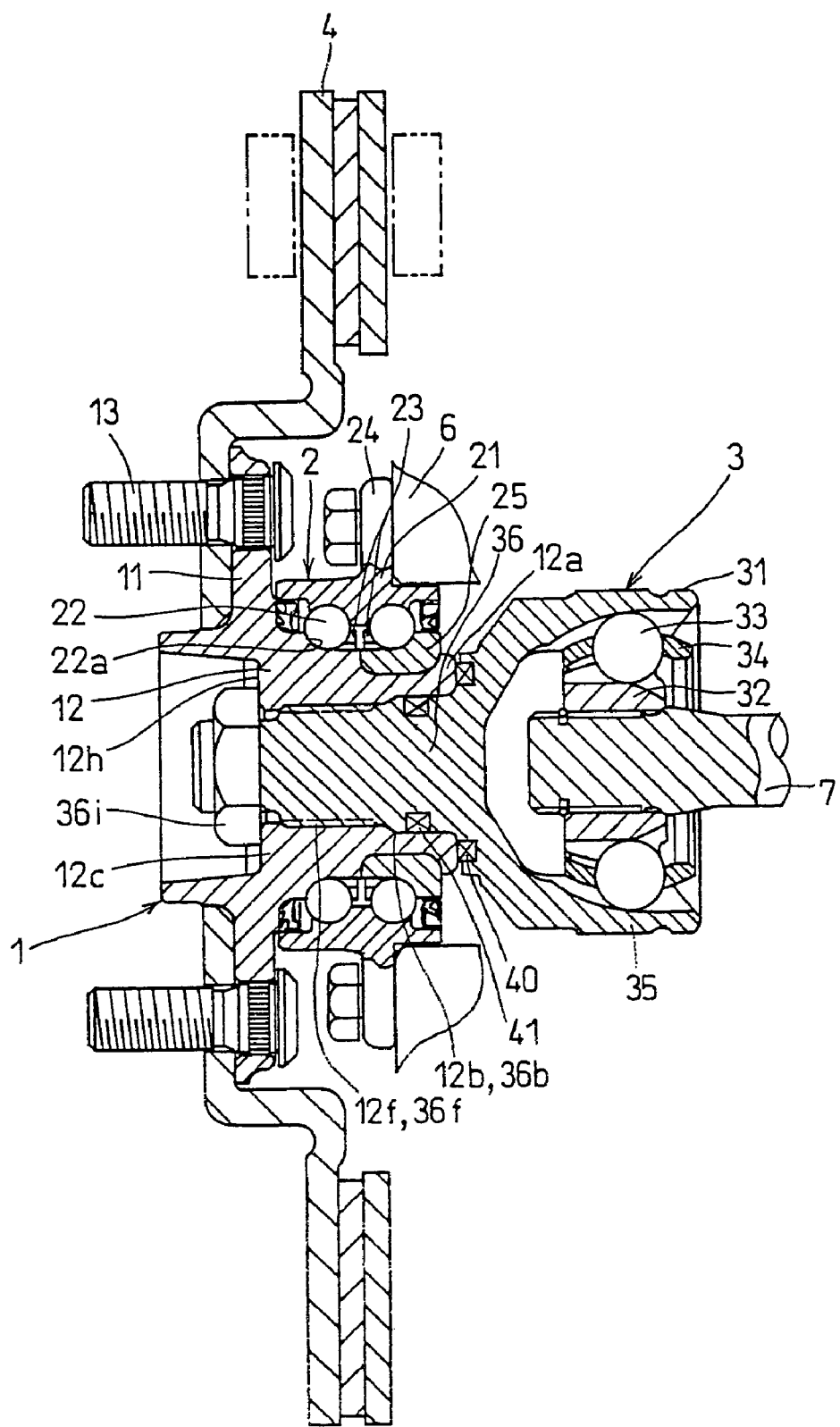
FIG. 10 is a side view in longitudinal section of a vehicle-use bearing device according to still another mode for executing the present invention.

In order to prevent the invasion of the muddy water, seals 40 and 41 in FIGS. 10 and 11 may be provided.

The seal 40 is made of an elastic body such as rubber or other materials and provided between axially opposing faces of the caulked portion 12a and the cup-shaped cylindrical portion 35.

Figure 11A:
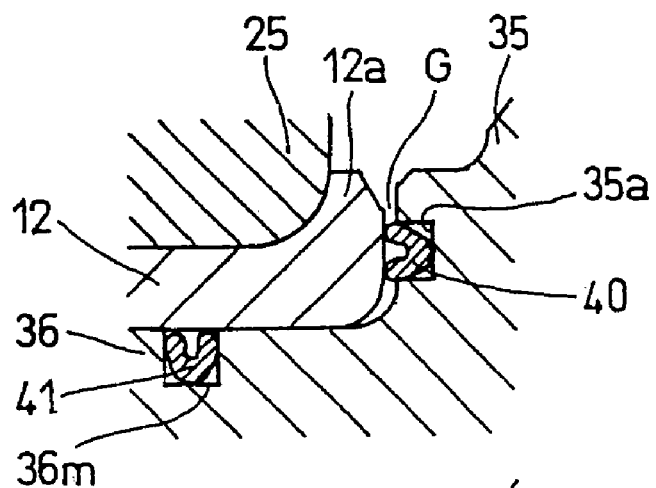
FIG. 11A is an enlarged sectional view of main parts with seals provided thereon of the bearing device in FIG. 10.
Figure 11B:
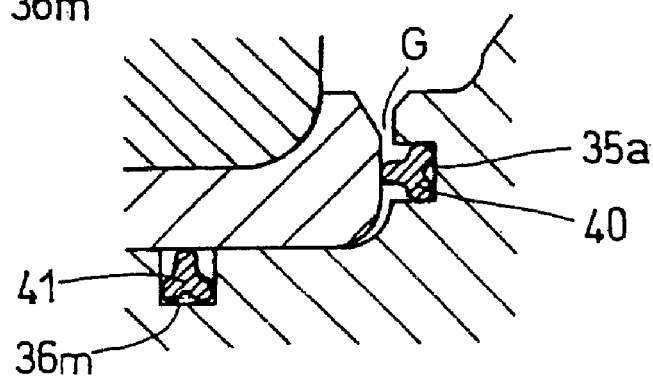
FIG. 11B is another enlarged sectional view of main parts with seals provided thereon of the bearing device in FIG. 10
Figure 11C:
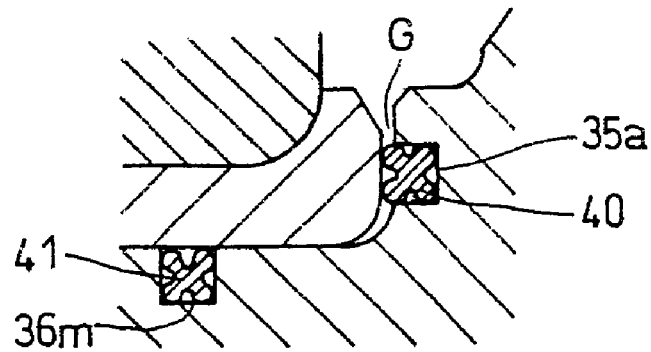
FIG. 11C is still another enlarged sectional view of main parts with seals provided thereon of the bearing device in FIG. 10
Figure 11D:
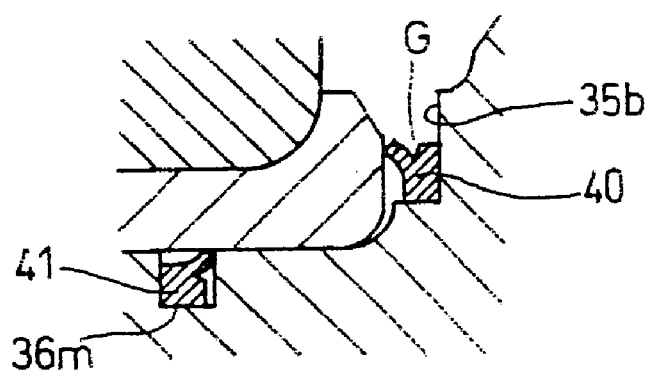
FIG. 11D is still another enlarged sectional view of main parts with seals provided thereon of the bearing device in FIG. 10
Figure 12:
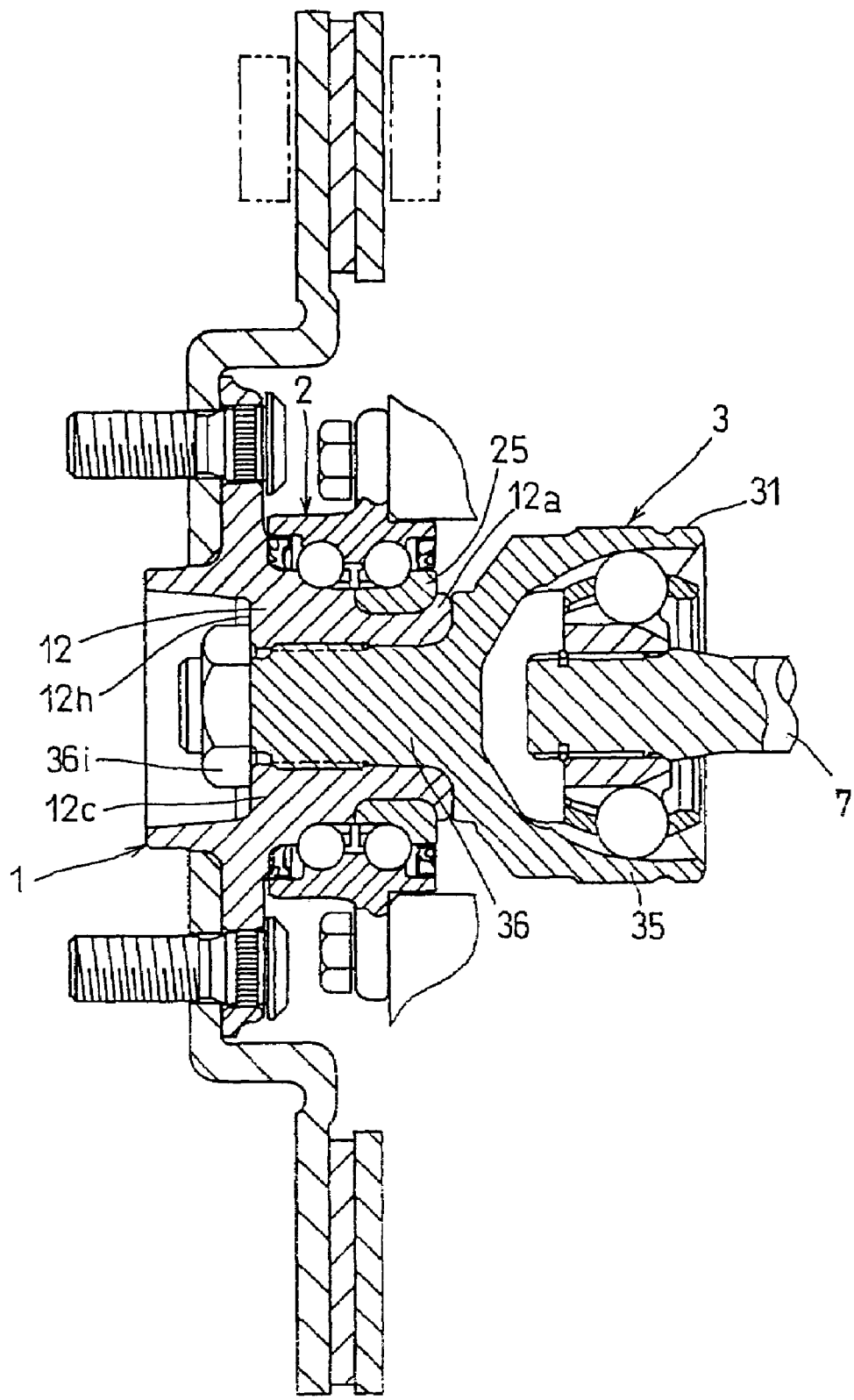
FIG. 12 is a side view in longitudinal section of a conventional vehicle-use bearing device.

To be specific, an annular groove 35a as a recess as shown in FIG. 11 A–C, and a cutout 35b as a recess as shown in FIG. 11D are provided on the axially opposing faces of the cup-shaped cylindrical portion 35. The seal 40, inserted into the annular groove 35a or the cutout 35b, prevents the muddy water from invading inside of the bearing by sealing the clearance G.

The seal 41 is made of an elastic body such as rubber or other materials, and provided on opposing faces of the inner peripheral region in the hollow shaft portion 12 located on the vehicle inner side with respect to the splines 12f and 36f and the outer peripheral region in the outer ring shaft portion 36 of the constant velocity joint 3.

To be specific, an annular groove 36m as a recess as shown in FIG. 11 A–D is provided on the outer peripheral surface of the outer ring shaft portion 36 of the constant velocity joint 3.

The seal 41 is inserted into the annular groove 36m to seal the clearance between the inner peripheral surface of the hollow shaft portion 21 and the outer peripheral surface of the outer ring shaft portion 36. Accordingly, the seal 40, together with the seal 41, prevents the muddy water from invading into the splines 12f and 36f to avoid corrosion.

Both the seals 40 and 41 are not necessarily required. At least one of them can be employed.

The seals 40 and 41 may be comprised of a seal lip fixed to an annular cored bar, which is inserted into the annular grooves 35a, 36m and the cutout 35b.

POSSIBILITY OF INDUSTRIAL APPLICATION

The present invention can be applied to a vehicle-use bearing device to which a disc rotor for a disk brake device in an automobile and a wheel can be fitted.

What is claimed is:

1. A vehicle-use bearing device comprising:
   a hub wheel having a hollow shaft portion;
   a rolling bearing fitted around the hollow shaft portion of the hub wheel; and
   a constant velocity joint tiltably coupling an input shaft with the hub wheel;
   wherein the constant velocity joint has an outer ring which comprises an outer ring cylindrical portion, said cylindrical portion housing an element for tilting guide with respect to the input shaft and an outer ring shaft portion, said shaft portion being provided adjacently to the outer ring cylindrical portion;
   wherein a shaft end on a vehicle inner side of the hollow shaft portion of the hub wheel is caulked on an outer end face on a vehicle inner side of an inner ring of the roiling bearing;
   wherein the outer ring shaft portion of the constant velocity joint is inserted into the hollow shaft portion of the hub wheel so as not to be circumferentially rotated;
   said hub wheel having an outer side opening and an intermediate portion, said intermediate portion being intermediate said vehicle inner side shaft end and said outer side opening of said hub wheel;
   said constant velocity joint having a vehicle inner side, a vehicle outer side shaft end and an axially intermediate portion, said axially intermediate portion of said constant velocity joint being intermediate said vehicle inner side and said vehicle outer side shaft end of said constant velocity joint; and
   wherein a held portion provided between said axially intermediate position and said vehicle outer side in the hollow shaft portion of the hub wheel is axially sandwiched between an axially intermediate position and said vehicle outer side in the outer ring shaft portion of the constant velocity joint, whereby the outer ring of the constant velocity joint is connected to the hub wheel in the manner in which the outer ring cylindrical portion of the constant velocity joint is free of contact with the shaft end on the vehicle inner side of the hollow shaft portion of the hub wheel caulked on the outer end face on the vehicle inner side of the inner ring of the rolling bearing.

2. A vehicle-use bearing device according to claim 1,
   wherein, in an inner periphery of the hollow shaft portion of the hub wherein, a distance between the vehicle inner side shaft end and the axially intermediate position is set to a large diameter, and a distance between the axially intermediate position and an opening on the vehicle outer side is set to a small diameter;
   wherein, in the outer periphery of the outer ring shaft portion of the constant velocity joint, a distance between the vehicle inner side shaft end and the axially intermediate position is set to a large diameter, and a distance between the axially intermediate position and the vehicle outer side shaft end is set to a small diameter; and
   wherein the outer ring shaft portion of the constant velocity joint is inserted from the vehicle inner side into the hollow shaft portion of the hub wheel in the manner in which a second step wall surface between the large diameter portion and the small diameter portion in the outer ring shaft portion of the constant velocity joint is abutted on a first step wall surface between the large diameter portion and the small diameter portion in the hollow shaft portion of the hub wheel, and thereby the axial position of the outer ring shaft portion with respect to the hollow shaft portion is determined.

3. A vehicle-use bearing device according to claim 2,
   wherein a fastening member is provided at a shaft end on the vehicle outer side of the outer ring shaft portion of the constant velocity joint; and
   wherein the first step wall surface and the vehicle outer side in the hollow shaft portion of the hub wheel is axially sandwiched between the second step wall surface and the fastening member in the outer ring shaft portion of the constant velocity joint so that the outer ring of the constant velocity joint is connected to the hub wheel.

4. A vehicle-use bearing device according to claim 3,
   wherein a nut is used as the fastening member, a small diameter screw shaft portion is provided at the vehicle outer side shaft end of the outer ring shaft portion, and the nut is screwed into the small diameter screw shaft portion; and wherein an end face of the nut is pushed against an outer end face on the vehicle outer side of the hollow shaft portion.

5. A vehicle-use bearing device according to claim 2, comprising a caulked portion formed by the vehicle outer side shaft end in the outer ring shaft portion bent and deformed radially outward to be caulked on an outer end face on the vehicle outer side of the hollow shaft portion;
wherein the first step wall surface and the vehicle outer side in the hollow shaft portion of the hub wheel is axially sandwiched between the second wall surface and the caulked portion in the outer ring shaft portion of the constant velocity joint so that the outer ring of the constant velocity joint is connected to the hub wheel.

6. A vehicle-use bearing device according to claim 1,
wherein, in the inner periphery of the hollow shaft portion of the hub wheel, a distance between the vehicle inner side shaft end and the axially intermediate position is set to a large diameter, a distance between the axially intermediate position and an opening on the vehicle outer side is set to a small diameter, and in the small diameter portion is provided a female spline having a groove bottom located on an inner diameter side with respect to the large diameter portion;
wherein, in the outer periphery of the outer ring shaft portion of the constant velocity joint, a distance between a shaft end on the vehicle inner side and the axially intermediate position is set to a large diameter, and a distance between the axially intermediate position and the vehicle outer side opening is set to a small diameter, and in the small diameter portion is provided a male spline having a tip located on the inner diameter side with respect to the large diameter portion;
wherein the outer ring shaft portion of the constant velocity joint is inserted from the vehicle inner side into the hollow shaft portion of the hub wheel, and an end portion on the vehicle inner side of the male spline in the outer ring shaft portion of the constant velocity joint is pushed against an end portion on the vehicle inner side of the female spline in the hollow shaft portion of the hub wheel so that the axial position of the outer ring shaft portion with respect to the hollow shaft portion is determined.

7. A vehicle-use bearing device according to claim 6,
wherein a small diameter screw shaft portion is provided at the vehicle outer side shaft end in the outer ring shaft portion, and a nut is screwed into the small diameter screw shaft portion;
wherein an end face of the nut is abutted on an outer end face on the vehicle outer side of the hollow shaft portion.

8. A vehicle-use bearing device according to claim 6, wherein the vehicle outer side shaft end of the outer ring shaft portion is bent and deformed radially outward to be caulked on an outer end face on the vehicle outer side of the hollow shaft portion.

9. A vehicle-use bearing device according to claim 1, wherein a seal is provided on opposing faces of the caulked portion formed by the shaft end on the vehicle inner side of the hollow shaft portion bent and deformed radially outward and the outer ring cylindrical portion of the constant velocity joint axially facing the caulked potion.

10. A vehicle-use bearing device according to claim 9, wherein the seal is inserted into a recess provided on one of the opposing faces to be pressed against the other opposing face.

11. A vehicle-use bearing device according to claim 1, wherein a seal is provided on opposing faces of an inner peripheral region located on the vehicle inner side with respect to the axially intermediate position in the hollow shaft portion of the hub wheel and an outer peripheral region in the outer ring shaft portion of the constant velocity joint.

12. A vehicle-use bearing device according to claim 11, wherein the seal is inserted into a recess provided on one of the opposing face to be pressed against the other opposing face.

* * * * *